(12) United States Patent
Broadwell et al.

(10) Patent No.: US 11,753,095 B2
(45) Date of Patent: Sep. 12, 2023

(54) TRUCK TOPPER REMOVAL DEVICE

(71) Applicants: James Broadwell, Auburn, CA (US); Bruce Broadwell, Meadow Vista, CA (US)

(72) Inventors: James Broadwell, Auburn, CA (US); Bruce Broadwell, Meadow Vista, CA (US)

(*) Notice: Subject to any disclaimer, the term of this patent is extended or adjusted under 35 U.S.C. 154(b) by 0 days.

(21) Appl. No.: 17/580,737

(22) Filed: Jan. 21, 2022

(65) Prior Publication Data
US 2022/0227439 A1    Jul. 21, 2022

Related U.S. Application Data

(60) Provisional application No. 63/139,830, filed on Jan. 21, 2021.

(51) Int. Cl.
*B62D 65/02* (2006.01)

(52) U.S. Cl.
CPC ................ *B62D 65/026* (2013.01)

(58) Field of Classification Search
CPC .................................................. B62D 65/026
See application file for complete search history.

(56) References Cited

U.S. PATENT DOCUMENTS

| | | | | | |
|---|---|---|---|---|---|
| 4,978,272 | A | * | 12/1990 | Leon | B66F 7/0658 193/35 MD |
| 2021/0053780 | A1 | * | 2/2021 | Eidsmore | B60P 1/003 |

* cited by examiner

*Primary Examiner* — Nirvana Deonauth
(74) *Attorney, Agent, or Firm* — Brennan, Manna & Diamond, LLC

(57) ABSTRACT

The present invention relates to a truck topper supporting table device for removing and storing a truck topper from a pickup truck. The truck topper table enables a single individual to easily remove and install the topper on their own, and avoids the topper from having to be placed onto the ground when it is not on the truck. The truck topper table has two pairs of scissor-style collapsible legs that can be adjusted to a desired height. The table has a pair of horizontal rails positioned on the collapsible legs with rollers disposed along the length of the rails for easily rolling off the topper of the truck and onto the table. The table has cross members for increasing strength of the table to withstand heavy truck toppers.

18 Claims, 6 Drawing Sheets

TRUCK TOPPER REMOVAL DEVICE

CROSS-REFERENCE TO RELATED APPLICATION

The present application claims priority to, and the benefit of, U.S. Provisional Application No. 63/139,830, which was filed on Jan. 21, 2021, and is incorporated herein by reference in its entirety.

FIELD OF THE INVENTION

The present invention relates generally to the field of accessories for pickup trucks. More specifically, the present invention relates to a novel table like or support device for removing a truck topper from a pickup truck and holding the topper for removal or later use. The truck topper table or support is made from a plurality of metal or other rigid support members and has scissor-style collapsible legs that can be adjusted to a desired height. The table or support has a pair of horizontal rails which are positioned to be adjacent the base of the topper with rollers disposed along the length of the rails for sliding the truck topper along the rails and off the back of the pickup. The truck topper is placed on the rails when not in use on the truck bed and thus prevents the topper from being placed onto the ground or from having to manually lift the topper off the pickup truck bed. Accordingly, this disclosure makes specific reference thereto the present invention. Nonetheless, it is to be appreciated that aspects of the present invention are also equally applicable to other like applications, devices and methods of manufacture.

BACKGROUND

By way of background, removably-attached truck toppers have existed for years and are devices adapted for placement on the bed of a standard pickup truck to thereby enclose the pickup truck bed. The topper are usually placed on the side body walls and in other embodiments may be positioned in the bed of the truck itself. Such devices sometimes consist of a tent-like structure that allows the trunk bed to be used as temporary sleeping quarters, or a canopy-type protective cover for enclosing and protecting cargo stored and transported therein. A standard truck topper has a front end, a rear end, a roof and side walls. Usually, a door is placed in the rear end of the truck topper and over the lift gate of the pickup truck to allow access to the contents of the pickup bed. The truck toppers typically covers the entire bed of the pickup truck, and are large enough to be used for camping purposes, thus making the vehicle an RV.

Generally, the truck toppers are removable and hardware tools such as releasing clamps and others are used for removing and installing the topper on the truck bed. Usually, the truck toppers are in the range of 100-140 pounds, thus make it difficult for a single individual to lift the topper alone for removal and installation. Further, the size of the truck toppers is large which makes it difficult for a single individual to control the topper alone. Therefore, it typically requires several people and often up to six individuals to assist in lifting the topper off of the truck bed and putting it back on the truck bed. The availability of multiple people is not always feasible, especially when a family is using the pickup truck.

Usually, when a truck topper is removed from the truck bed, it is placed on ground or floor. This not only can physically damage the topper but may cause injury to any individual passing nearby the topper. Further, it is difficult for people to put the topper on ground and lift the heavy topper from ground and carry it to the pickup truck for installation.

Therefore, there exists a long felt need in the art for a support device that can be used to easily store or accommodate a truck bed shell or topper and eliminates the topper from being placed onto the ground when the topper is not on the truck. There is also a long felt need in the art for a truck topper carrying device that enables one individual to easily remove and install the topper on their own. Additionally, there is a long felt need in the art for a truck topper carrying and support device that eliminates lifting of the topper from the truck and putting it on the ground. Moreover, there is a long felt need in the art for a device that eliminates the difficulty associated with the removal and installation process of a truck bed shell or topper. Further, there is a long felt need in the art for a device that can hold the truck topper when not in use. Finally, there is a long felt need in the art for a device that acts like an interim table or support for a truck topper and can be used for removing, installing, supporting and holding the truck topper without causing any physical damage to the topper.

The subject matter disclosed and claimed herein, in one embodiment thereof, comprises a truck topper or shell table or support apparatus. The truck topper table apparatus is configured to be positioned on the rear of a pickup truck for removing and installing a truck topper and for holding a truck topper or shell when the topper is not in use. The truck topper table or supporting apparatus of the present invention prevents the topper or shell from being placed onto the ground when the topper or shell is not on the truck.

In this manner, the truck topper or shell table or supporting device of the present invention accomplishes all of the forgoing objectives and provides users with a device designed to remove and store a truck bed shell or topper. The invention enables a single individual to take the topper on and off the truck bed without having to manually lift the topper from the back of the truck bed. The rollers on the device make it easy for the individual to hold the topper on the device and the device can be placed at any convenient location, thereby eliminating the topper from being placed onto the ground when it is not on the truck.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a truck topper or shell table or supporting apparatus. The truck topper or shell table apparatus is configured to be positioned adjacent the rear of a pickup truck and at a height of the walls of the bed for removing and installing a truck topper or shell and holding a truck topper when the topper is not in use. The support prevents the topper or shell from being placed onto the ground when the topper or shell is not on the truck. The truck topper table further includes a first pair of collapsible legs pivotally-connected together in a collapsible or scissor-like style at a first central pivot point, and a second pair of collapsible legs pivotally-connected together in a scissor-like style at a second central pivot point. A first horizontal rail is placed or positioned on the first pair of collapsible legs. The first horizontal rail has a plurality of rollers disposed along the length of the rail, and a second horizontal rail positioned on the second pair of collapsible legs. The second horizontal rail has a plurality of rollers which are disposed along the length of the second rail, and a first hinged supporting leg extending from one end of the first rail and a second hinged supporting leg extending from one end of the second rail. The first hinged supporting leg and the second hinged supporting leg are positioned on the bumper or back step of the truck with the rails positioned along the bottom edge of the truck topper or shell, thereby enabling the truck topper or shell to slide along the first rail and the second rail.

In yet another embodiment, an apparatus for removing an installed truck topper or shell from the truck bed of a pickup truck is disclosed. The invention includes a pair of hinged supporting legs having a first supporting leg and a second supporting leg positioned on the bumper or a step of the truck. A pair of horizontal rails includes a first rail and a second rail, with each rail having a plurality of rollers disposed along the length of the rail and spaced apart from one another. The first rail is pivotally-connected to the first supporting leg, and the second rail is pivotally-connected to the second supporting leg. A first pair of scissors-style connected legs is positioned on the underside of the first rail, and a second pair of scissors-style connected legs is positioned on the underside of the second rail such that the first pair of scissors style connected legs and the second pair of scissors style connected legs are positioned on the ground for supporting the frame. The height of the invention is adjusted such that the first rail and the second rail are in vertical alignment with the installed truck topper or shell such that the longitudinal edges or base of the truck topper are slid or moved along the first rail and the second rail, thereby allowing the removal of the installed truck topper or shell from the pickup truck.

In yet another embodiment, the apparatus with the truck topper placed on the rails is configured to be removed from the rear of the pickup truck, thereby preventing the truck topper from being placed on the ground.

In yet another embodiment, the apparatus is collapsible such as with scissors-style legs to support the shell with the first rail and the second rail.

In yet another embodiment, the rails are formed from a diamond plate and the length of the rails is longer than the length of the truck topper.

In yet another embodiment, the apparatus has cross members for increasing the strength of the table or support to withstand heavy truck toppers.

In yet another embodiment of the present invention, a method for removing and storing a truck bed shell or topper using a standalone truck topper table or support is described. The method includes the step of placing the table at the rear of or adjacent to a vehicle or pickup truck, sliding the truck topper along the rails of the table with the rails having rollers to slide the truck topper. Next, the table is removed from rear of the vehicle when the truck topper is placed on the rails, and finally, withdrawing the table from rear of the vehicle and storing the table at a convenient location.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
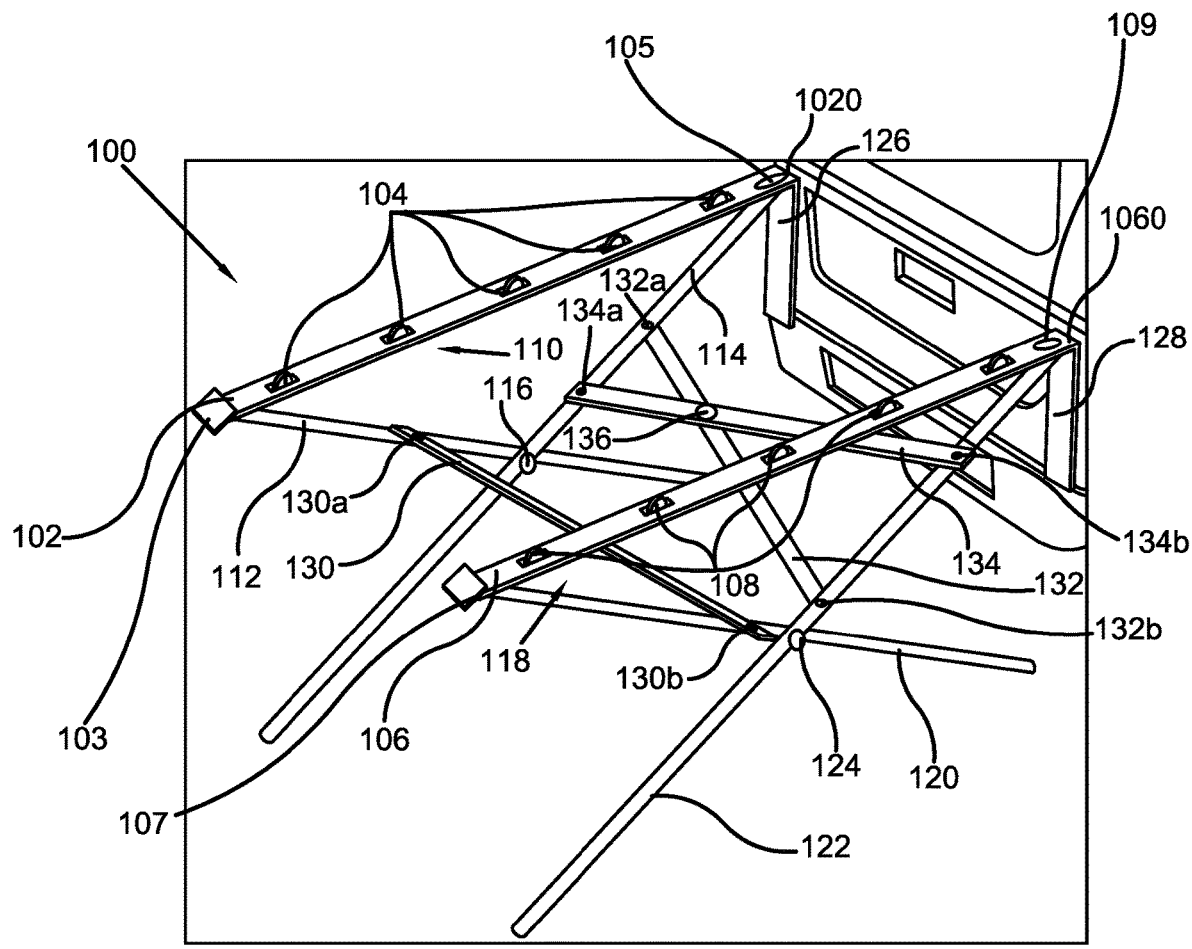
FIG. 1 illustrates a perspective view of one potential embodiment of a truck topper table of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a device that can easily remove, store or accommodate a truck bed shell or topper and eliminates the topper from being placed onto the ground when the topper is not in use on the truck. There is also a long felt need in the art for a truck topper or shell removal and carrying device that enables one individual to easily remove and install the topper on their own, without the need of having a number of other individuals to help. Additionally, there is a long felt need in the art for a truck topper removal and carrying device that eliminates the need for lifting of the topper off the truck bed and then putting the bed or shell on the ground. Moreover, there is a long felt need in the art for a device that eliminates the difficulty associated with the removal and installation process of a truck bed shell or topper. Further, there is a long felt need in the art for a device that can hold the truck topper when not in use. Finally, there is a long felt need in the art for a device that acts like a table or support for a truck topper and can be used for removing, installing and holding the truck topper without causing any physical damage to the topper.

The present invention, in one exemplary embodiment, is a novel truck topper table apparatus for removing and storing an installed truck topper or shell from a truck bed of a pickup truck. The apparatus includes a pair of hinged supporting legs positioned on the bumper or step of the truck, a pair of horizontal rails including a first rail and a second rail, with each rail having a plurality of rollers, and in one embodiment five rollers per side. The first rail is pivotally-connected to a first supporting leg, and the second rail is pivotally-connected to a second supporting leg. A first pair of scissors-style connected legs are positioned on the underside of the first rail, and a second pair of scissors-style connected legs are positioned on underside of the second rail. The first pair of scissors style connected legs and the second pair of scissors-style connected legs are positioned on the ground for supporting the topper or shell.

Figure 2:
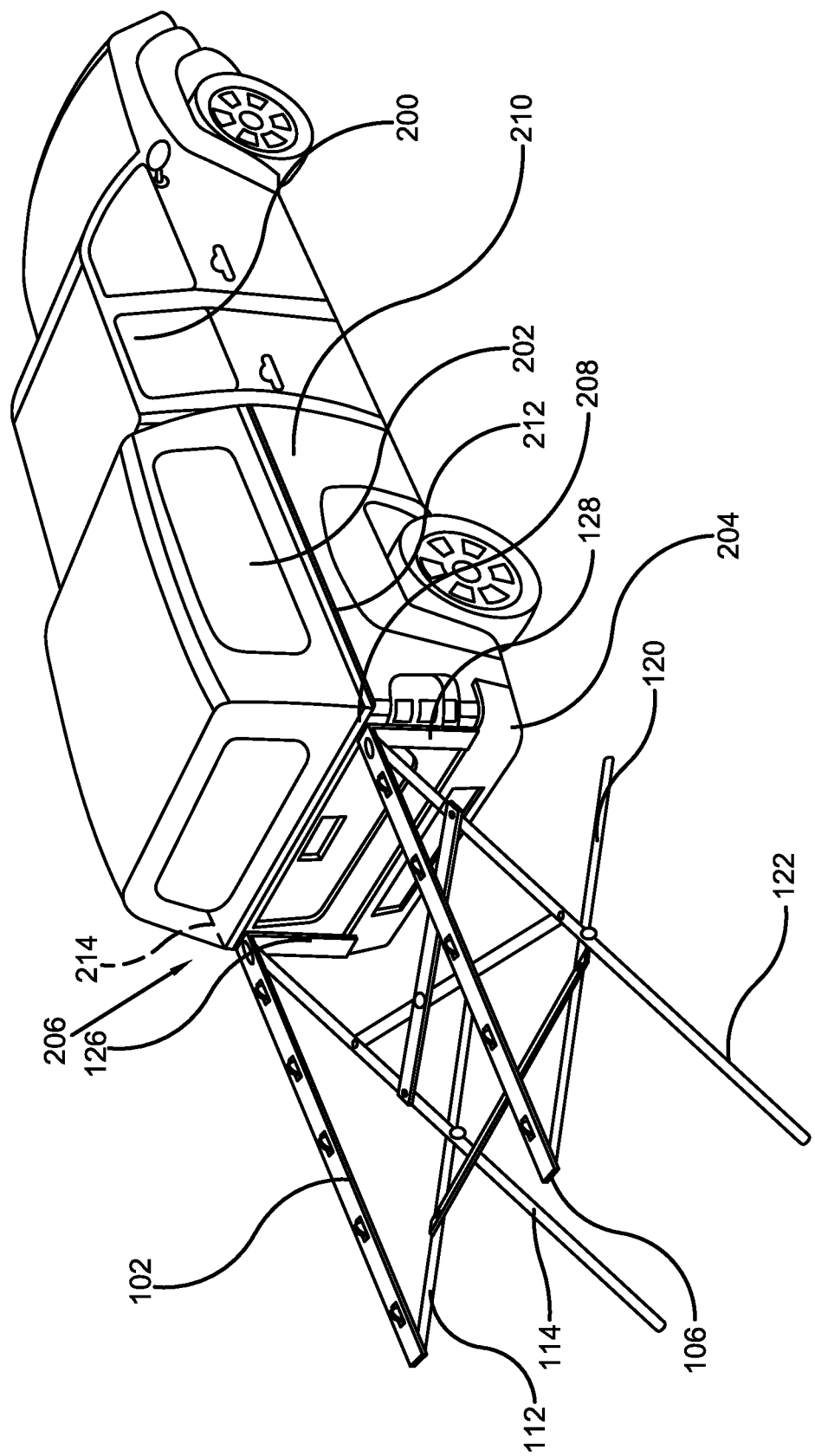
FIG. 2 illustrates a perspective view of one potential embodiment of the truck topper table placed at the rear of the vehicle for removing an installed truck topper in accordance with the disclosed architecture.

Referring initially to the drawings, FIG. 1 illustrates a perspective view of one potential embodiment of truck topper table or support 100 of the present invention in accordance with the disclosed specification. The truck topper table or support 100 of the present invention is designed to remove and store a truck bed shell or topper. More specifically, the table or support 100 has a pair of rails including a first rail 102 and a second rail 106. The first and second rails are of equal length. The rails 102, 106 are generally horizontal and used in a planar alignment with the truck bed when raised to the height of the body walls of the bed. The rails are used for placing and rolling a truck topper as best shown in FIG. 2. The first rail 102 has a plurality of rollers 104 that are used for sliding the truck topper or shell along the first rail 102. Similarly, the second rail 106 has a plurality of rollers 108 that are used for sliding the truck topper along the second rail 106. The first rail 102 and the second rail 106 are dimensioned and designed such that the longitudinal or bottom edges of the truck topper are placed on the rails 102, 106 such that the table 100 supports and holds the truck topper. The rollers are preferably equally spaced apart along the length of the rails. In an alternative embodiment, there may be two additional rollers 105 and 109, such as feed rollers, are disposed at the front end or leading ends of the rails to assist with starting the removal of the topper or shell.

For supporting the truck topper on the table 100, the underside 110 of the first rail 102 has a first front leg 112 and a first rear leg 114. The first front leg 112 and the first rear leg 114 are pivotally-connected at a first central pivot point 116. The first front leg 112 and the first rear leg 114 form the first leg assembly and the legs 112, 114 are connected in a crisscrossing manner. The legs 112, 114 can move forward and backward on the floor to adjust the height of the table 100 and the first rail 102 and second rail 106. At the end 1020 of the first rail 102, a first supporting leg 126 extends perpendicularly relative to the first rail 102 and downwardly from the rail and is used for resting on a portion of the pickup truck body such as the bumper or step of the pickup truck (shown in FIG. 2) when the table 100 is in use and the topper is taken on and off of the vehicle. The first and second rails 102 and 106 may be provided with stops 103 and 107 to prevent the topper or shell from rolling off the rails as it moves down the rails via the rollers.

Similarly, for supporting the truck topper or shell on the table 100, the underside 118 of the second rail 106 has a second front leg 120 and a second rear leg 122 such that the second front leg 120 and the second rear leg 122 are pivotally-connected at a second central pivot point 124. The second front leg 120 and the second rear leg 122 form the second leg assembly and the legs 120, 122 are connected in crisscrossing manner. The legs 120, 122 can move forward and backward on the floor to adjust the height of the table 100 and the second rail 106. At the end 1060 of the second rail 106, a second supporting leg 128 extends perpendicularly relative to the second rail 106, and downwardly from the second leg and is used for resting on a portion of the pickup truck body such as a bumper or step of the pickup truck (shown in FIG. 2) when the table or support 100 is in use and the topper or shell is taken on and off of the vehicle body. The first supporting leg 126 and the second supporting leg 128 are connected to the respective rails through hinges (shown in FIG. 4) that allow the supporting legs to be pivotally-movable, thereby assisting in collapsing or reducing the height of the table 100.

For providing support to hold heavy truck toppers, the first front leg 112 and the second front leg 120 have one or more cross pieces 130 attached to both the first front leg 112 and the second front leg 120. The cross piece 130 is removably-attached to the first front leg 112 using a mechanical fastener 130a and is removably-attached to the second front leg 120 using a mechanical fastener 130b. It should be appreciated that the cross piece 130 can be permanently connected to both the first front leg 112 and the second front leg 120 using welding.

Also, the first rear leg 114 and the second rear leg 122 have one or more cross pieces 132, 134 attached to both the first rear leg 114 and the second rear leg 122. As shown, the cross piece 132 is removably-attached to the first rear leg 114 using a mechanical fastener 132a and is removably-attached to the second rear leg 122 using a mechanical fastener 132b. The cross piece 134 is removably-attached to the first rear leg 114 using a mechanical fastener 134a and is removably-attached to the second rear leg 122 using a mechanical fastener 134b. It should be appreciated that the cross piece 132, 134 can be permanently connected to both the first front leg 112 and the second front leg 120 by welding. The cross members 132, 134 are connected to each other in the form of an "X" with a central connecting member 136 that allows a pivotal movement of the cross members 132, 134. The cross members stabilize and strengthen the legs of the table or support 100 and are provided to stiffen the frame structure.

The table 100 is collapsible with the front legs 112, 120 and the rear legs 114, 112 collapsed to align substantially horizontally with the rails 102, 106. Further, the supporting legs 126, 128 may also be collapsed for easy portability of the device 100. The first leg assembly and the second leg assembly are pivotal and help in adjusting height of the table 100 as per the height of the vehicle with which the truck topper table 100 is to be used.

Figure 6:
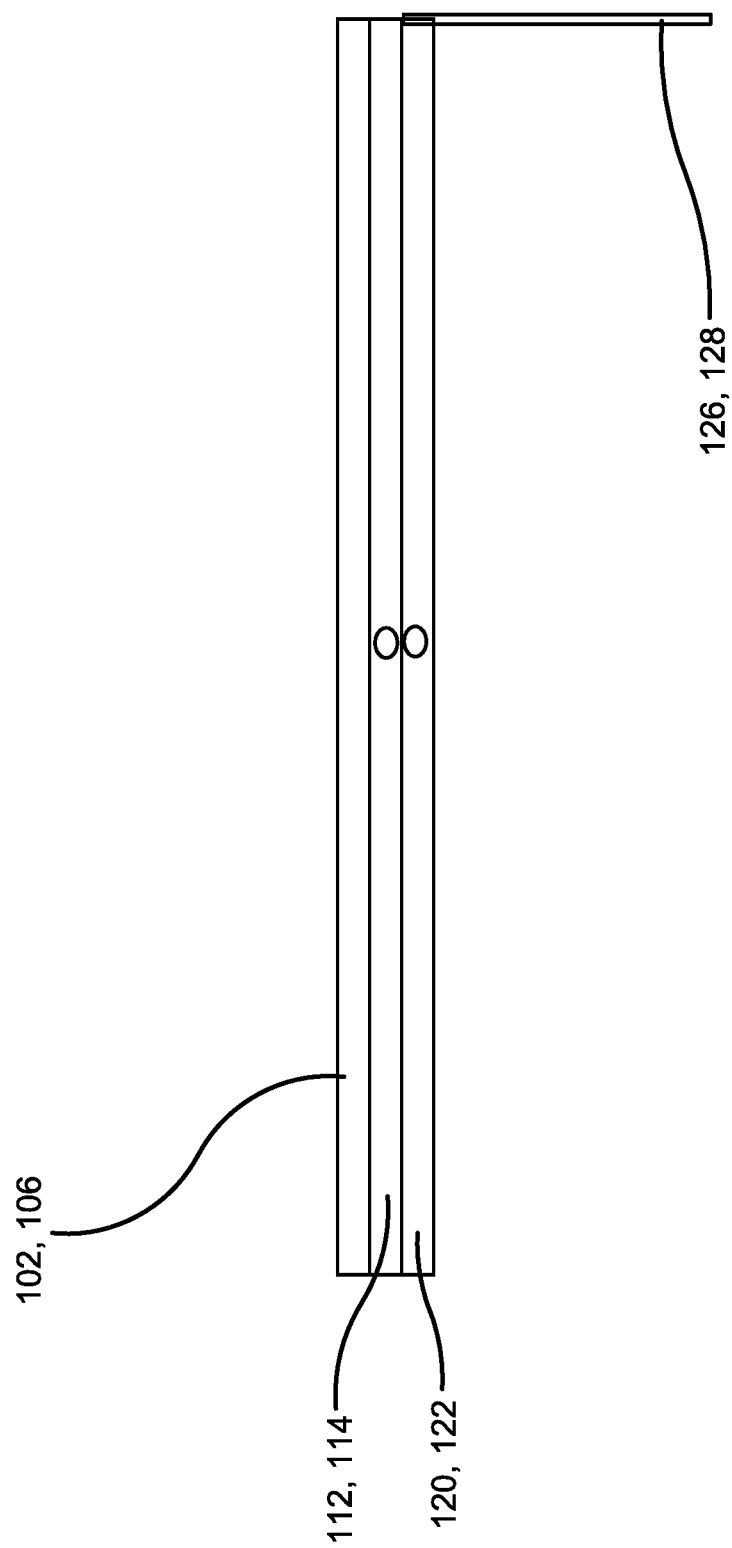
FIG. 6 illustrates a perspective view of the truck topper table of the present invention in a collapsed state in accordance with the disclosed architecture.

It should be appreciated that the truck topper table 100 is adjustable so as to vary the height of the rails 102, 106 from the ground. For example, the table 100 may be adjustable between a collapsed configuration, as shown in FIG. 6, and a fully extended configuration, as shown in FIG. 1, as well as any number of intermediate positions. In order to permit the movement of the table 100 between the various heights, the crisscrossing legs are pivotably-connected at the central pivot points as described earlier in the disclosure. The height adjustment of the table 100 is driven by the mechanical height adjustment assembly.

FIG. 2 illustrates a perspective view of the truck topper table or support placed at the rear of the vehicle 200 for removing an installed truck topper in accordance with the disclosed specification. For installing the table 100 to remove or install a truck topper 202, the table or support 100 is used in a fully or partial extended version. The table 100 is installed adjacent or at the rear 206 of the vehicle 200 with the first supporting leg 126 and the second supporting leg 128 positioned on the bumper or step 204 of the vehicle 200. The supporting legs 126, 128 not only provide the balance to the table 100 when installed at rear of the vehicle 200, but also help in aligning the table 100 with the table topper 202.

The rails 102, 106 are positioned horizontally with the first front leg 112 and the first rear leg 114 and the second front leg 120 and the second rear leg 122 supporting the table or support 100 on the ground. The rails 102, 106 are adjusted to a desired height as per the height of the vehicle 200 such that the rails 102, 106 are aligned with the bottom edge 208 of the truck topper 202. The truck topper 202 when unassembled from the vehicle's truck bed 210, is slid on the rails 102, 106 such that the side edge 212 is positioned on the second rail 106 and the opposite side edge 214 is positioned on the first rail 102 of the table 100 as best shown in FIG. 3.

The rails 102, 106 are formed of diamond plate having a thickness from ⅟₁₆ of an inch to ⅛ of an inch, and thus the table topper 100 is placed securely and stably on the rails 102,106 with the rollers rolling the table topper 202 along the rails 102, 106. It should be appreciated that a single individual can install the truck topper or shell installation and removing device 100 and then slide the table topper 202 on the rails 102, 106 of the truck topper holding device 100. The legs of the table provide adequate support and grip on the ground, preventing the table 100 from skidding on the surface. It should be noted that the pivotal movement of the legs and adjusting height of the table 100 is performed as described in FIG. 1 for a safe and efficient removal of the truck topper 202 from the pickup truck 200.

Figure 3:
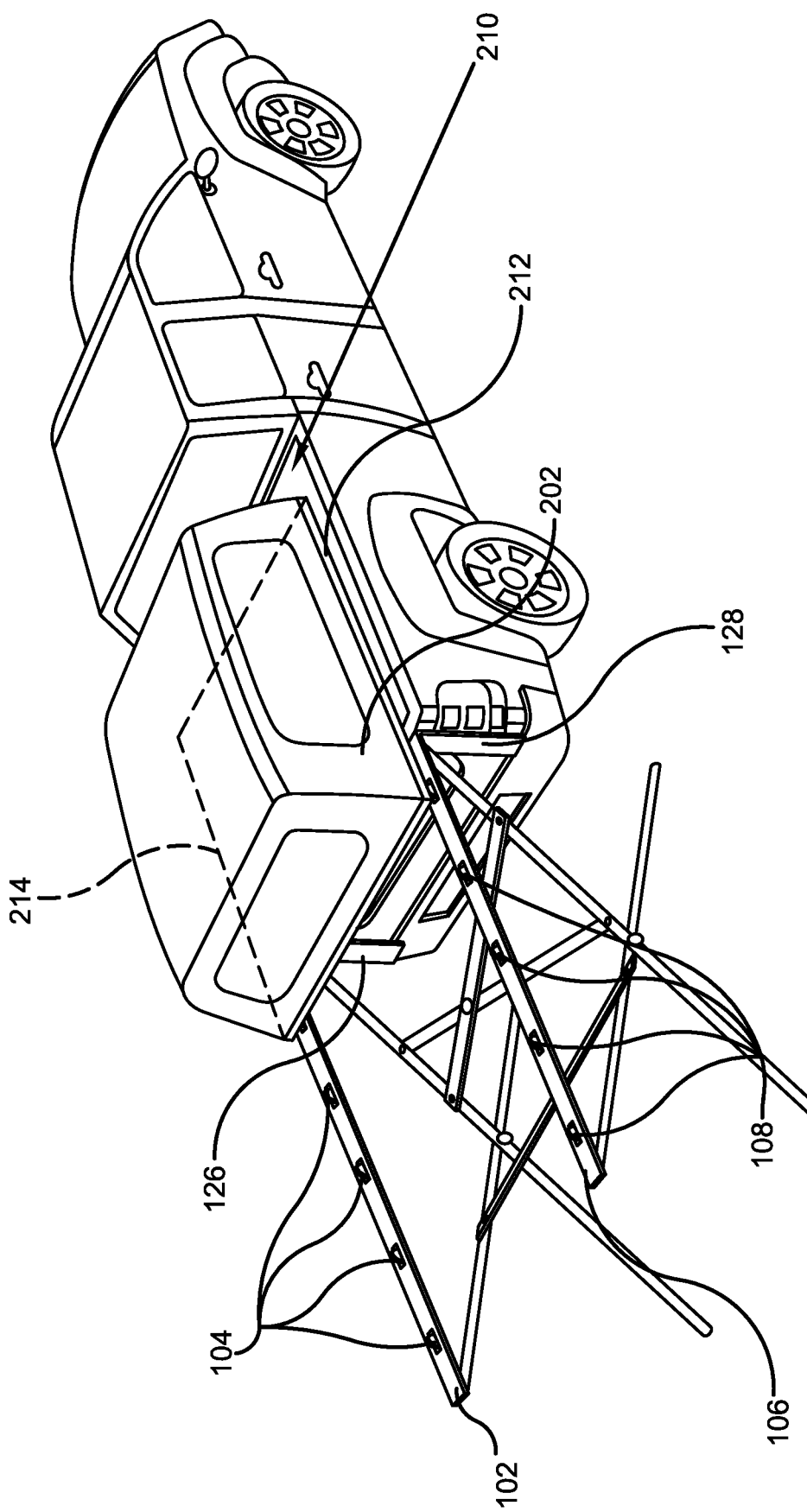
FIG. 3 illustrates a perspective view of the truck topper being rolled onto one potential embodiment of the truck topper table of the present invention in accordance with the disclosed architecture.

FIG. 3 illustrates a perspective view of the truck topper 202 being rolled onto the truck topper table 100 of the present invention in accordance with the disclosed specification. As shown in the present embodiment, the truck topper 202 is removed from the truck bed 210 and is slid onto the rails 102, 106. The rails 102, 106 are positioned to support the side edges 214, 212 of the truck topper 202 such that the side edges 214, 212 are rolled easily on the rails 102, 106 respectively, using the first set of rollers 104 and the second set of rollers 108. The rollers 104, 108 allow an easy sliding movement of the heavy truck topper 202 along the rails 102, 106 without applying much force by an individual. Rollers 104 and 108 may be manufactured from any suitable material such as a silicone rubber, plastic such as polypropylene and polyethylene, stainless steel, rubber and combinations thereof.

As shown, the truck topper 202 is partially placed on the table 100 and partially placed on the truck bed 210 and a user can pull and slide the truck topper 202 along the rails 102, 106 easily to completely remove the truck topper 202 from the vehicle. The table 100 eliminates the need for a user to lift the truck topper 202 and place it at any other location.

Figure 4:
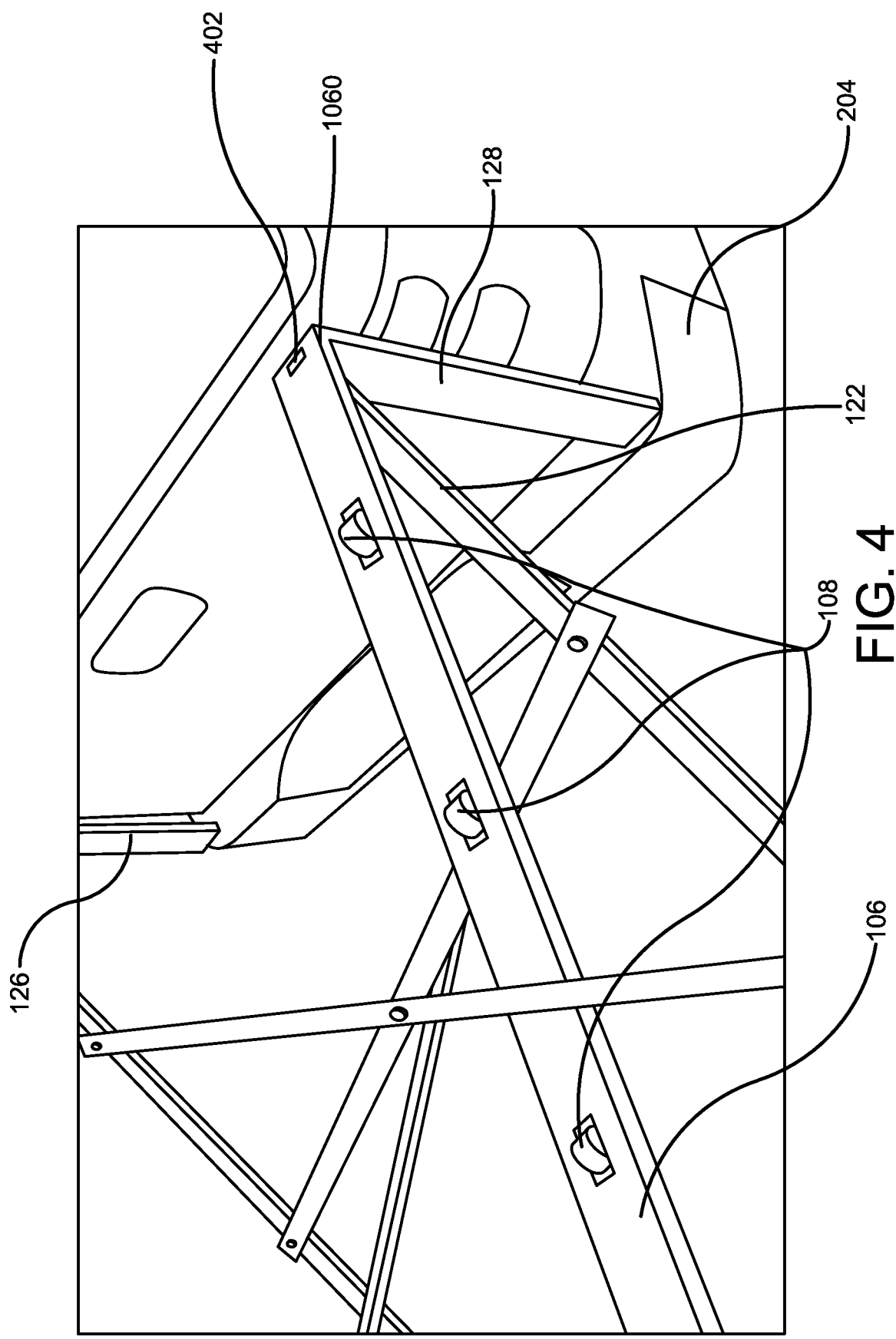
FIG. 4 illustrates a close-up perspective view of the connection of the leg support and the second rail along with the rollers used in the truck topper table in accordance with the disclosed architecture.

FIG. 4 illustrates a close view of the connection of the leg support 128 and the second rail 106 along with the rollers 108 used in the truck topper table 100 in accordance with the disclosed specification. The same connection used with the second rail 106 and the second leg support 128 is used for the first rail 102 and the first leg support 126. As shown, the second leg support 128 is connected to the second rail 106 through a hinge 402 that allows a pivotal movement of the second leg support 128 relative to the second rail 106. Further, when the second leg support 128 is perpendicularly positioned relative to the second rail 106, then the second leg support 128 is locked in a stable and secure position. The pivotal movement is useful while collapsing the truck topper or shell installation and removing the device 100 when the device 100 is not in use. In use, the leg supports 126, 128 are placed on the bumper or truck step 204 which provides stability to the truck topper shell holding device 100. The rollers 108 are integrated with the second rail 106 and can rotate in both clockwise and counterclockwise directions. This allows sliding of the truck topper in both forward and rear directions and thus makes the installation and removal of the truck topper easy and convenient.

Also, in FIG. 4, the second rear leg 122 is connected at the attachment point 1060 of the second rail 106 is shown. The other end of the second rear leg 122 is placed on the ground enabling the second rear leg 122 to be moved to align with the second rail 106 when collapsing the table 100.

Figure 5:
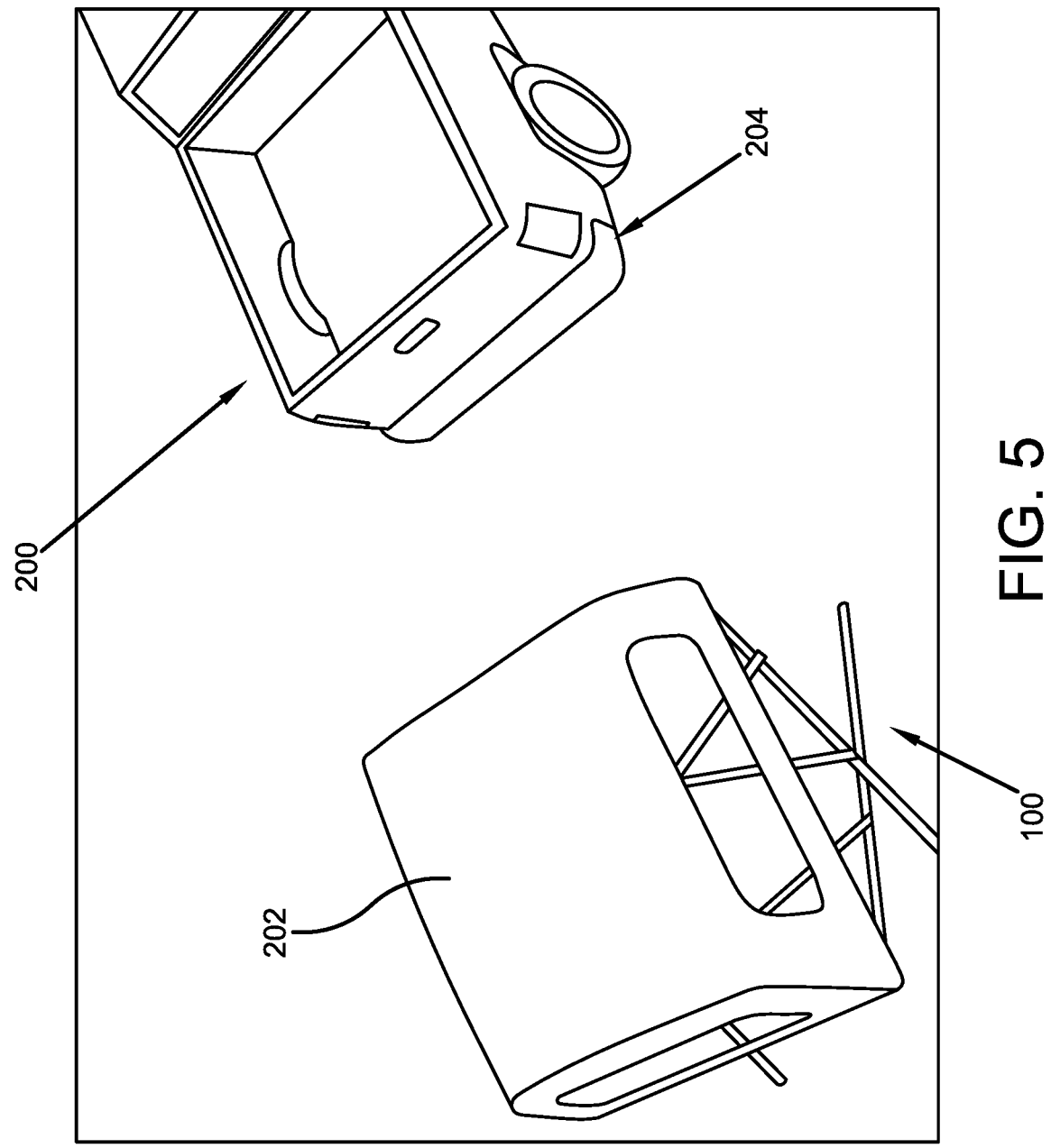
FIG. 5 illustrates a perspective view showing the truck topper placed on the table of the present invention where the table is removed from rear of the vehicle for safe storage in accordance with the disclosed architecture.

FIG. 5 illustrates a perspective view showing the truck topper placed on the table 100 of the present invention where the table is removed from rear of the vehicle for safe storage in accordance with the disclosed specification. One advantage of the truck topper shell holding device 100 is that it prevents the topper 202 from being placed onto the ground when the topper 202 is not on the truck 200 or is not in use. The table 100 with the topper 202 placed on the rails is removed from the rear of the vehicle 200 and can be pushed to a storage area as per the requirements of a user. The truck topper holding device 100 has the topper 202 placed on it and can be easily pushed or pulled while the topper 202 remains positioned on the table 100.

FIG. 6 illustrates a perspective view of the truck topper or shell table of the present invention in a collapsed state in accordance with the disclosed specification. As stated earlier, the table 100 is collapsible and can be stored easily when it is not being used for storing and holding a truck topper or shell. In the collapsed state, the height of the table 100 is decreased and the collapsible legs 112, 114, 120, 122 are pivotally moved to adhere to the rails 102, 106. The supporting legs 126, 128 are also moved from their original position of being perpendicular to the rails to secure the rails to the table 100 in a collapsed state.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "truck topper holding device", "truck topper table", "table", "apparatus", "device", and "truck topper installation and removing device" are interchangeable and refer to the truck topper table or removal device 100 of the present invention.

Notwithstanding the forgoing, the truck topper table 100 of the present invention can be of any suitable size and configuration as is known in the art without affecting the overall concept of the invention, provided that it accomplishes the above-stated objectives. One of ordinary skill in the art will appreciate that the size, configuration and material of the truck topper table 100 as shown in the FIGS.

are for illustrative purposes only, and that many other sizes and shapes of the truck topper table 100 are well within the scope of the present disclosure. Although the dimensions of the truck topper table 100 are important design parameters for user convenience, the truck topper table 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An accessory for use with a pickup truck, the accessory comprising:
    a first rail and a second rail having an equal length, wherein each of the first and second rails are comprised of a plurality of rollers disposed along a top surface of each of the first and second rails;
    a first and second pair of collapsible legs attached to the first and second, rail respectively;
    a set of cross pieces connecting each of the first and second pair of collapsible legs to one another;
    a first supporting leg connected by a hinge to the first rail; and
    a second supporting leg connected to the second rail by a second hinge, wherein the first supporting leg extends downwardly from the first rail and the second supporting leg extends downwardly from the second rail.

2. The accessory as recited in claim 1, wherein the first and second supporting legs are positioned on a portion of a body of the pickup truck.

3. The accessory as recited in claim 2, wherein the portion of the body of the pickup truck is a bumper or a truck step.

4. The accessory as recited in claim 1, wherein each of the first and second rails comprise a stop disposed at an end of each of the first and second rails.

5. The accessory as recited in claim 1, wherein the plurality of rollers of the first rail and the plurality of rollers of the second rail are spaced equally apart from one another along a length of the first and second rails.

6. The accessory as recited in claim 1, wherein a leading edge of the plurality of rollers of the first rail and the plurality of rollers of the second rail each has a feed roller.

7. The accessory as recited in claim 1, wherein the first and second pair of collapsible legs collapse in a scissor action.

8. The accessory as recited in claim 1, wherein each pair of the first and second pair of collapsible legs is connected to a cross piece of the set of cross pieces by a fastener.

9. The accessory as recited in claim 1, wherein the plurality of rollers of the first rail and the plurality of rollers of the second rail are manufactured from at least one of a silicone rubber, a plastic, a polypropylene, a polyethylene, a stainless steel, a rubber of a combination thereof.

10. The accessory as recited in claim 1, wherein the first and second rails are manufactured from a diamond plate.

11. The accessory as recited in claim 10, wherein a thickness of the diamond plate ranges from 1/16 of an inch to 1/8 of an inch.

12. A truck topper removal device comprising:
    a pair of rails having a length equal to a length of a truck topper, wherein each of a first rail and a second rail of the pair of rails is comprised of a stop at one end and a plurality of openings holding a plurality of rollers movable in a clockwise or counterclockwise direction;
    a first and second supporting leg connected to the first and second rail of the pair of rails, respectively;
    a plurality of cross pieces connecting each of the pair of rails to one another; and
    a first and second set of collapsible legs positioned on the first and second rail, respectively;
    wherein the first and second set of collapsible legs move in a scissor action.

13. The truck topper removal device as recited in claim 12, wherein the plurality of rollers of the first rail and the plurality of rollers of the second rail are spaced equally apart along a surface of each of the first and second rail of the pair of rails.

14. The truck topper removal device as recited in claim 12, wherein each of the first and second rail of the pair of rails are comprised of a diamond plate having a thickness ranging from 1/16 of an inch to 1/8 of an inch.

15. The truck topper removal device as recited in claim 12, wherein each of the first and second rail of the pair of rails are comprised of a feed roller at a front end of each of the first and second rail of the pair of rails.

16. The truck topper removal device as recited in claim 12, wherein the plurality of rollers of the first rail and the plurality of rollers of the second rail are manufactured from at least one of a silicone rubber, a plastic, a polypropylene, a polyethylene, a stainless steel, a rubber and a combination thereof.

17. A supporting table for a truck topper, the supporting table comprising:
    a first rail;
    a second rail, wherein each of the first and second rails comprise a plurality of rollers and a stop located at a second end of each of the first and second rails respectively;
    a first and second pair of collapsible legs connected to the first and second rail, respectively, wherein each of the first and second pair of collapsible legs comprises a set of cross pieces;
    a first supporting leg connected to the first rail at a first end; and
    a second supporting leg connected to a first end of the second rail, wherein each of the first and second supporting legs is placed on a bumper of a pickup truck.

18. The supporting table as recited in claim 17, wherein each of the first and second rails are made from a diamond plate having a thickness ranging from 1/16 of an inch to 1/8 of an inch.

* * * * *